(12) United States Patent
Yoshimoto et al.

(10) Patent No.: US 6,772,955 B2
(45) Date of Patent: Aug. 10, 2004

(54) MEMORY CARD

(75) Inventors: Tetsuro Yoshimoto, Osaka (JP);
Takayuki Tanaka, Osaka (JP); Miki Mizushima, Osaka (JP); Ryouichi Sugita, Osaka (JP); Takafumi Kikuchi, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

(21) Appl. No.: 10/193,283

(22) Filed: Jul. 12, 2002

(65) Prior Publication Data

US 2003/0160102 A1 Aug. 28, 2003

(30) Foreign Application Priority Data

Feb. 28, 2002 (JP) .................................... 2002-053099

(51) Int. Cl.[7] .............................................. G06K 19/06
(52) U.S. Cl. ...................... 235/492; 235/375; 235/380; 235/382; 361/737; 711/101; 711/102; 711/103
(58) Field of Search ................................. 235/375, 379, 235/380, 382.5, 492, 382; 361/737; 711/101, 102, 103

(56) References Cited

U.S. PATENT DOCUMENTS

| 5,126,541 A | * | 6/1992 | Shinagawa ................... 235/438 |
| 5,491,827 A | * | 2/1996 | Holtey ........................ 711/163 |
| 5,504,701 A | | 4/1996 | Takahashi et al. |
| 5,809,558 A | * | 9/1998 | Matthews et al. ........... 711/173 |
| 5,912,453 A | | 6/1999 | Gungl et al. |
| 5,923,884 A | * | 7/1999 | Peyret et al. ................ 717/167 |
| 6,308,317 B1 | * | 10/2001 | Wilkinson et al. .......... 717/139 |
| 6,338,435 B1 | * | 1/2002 | Carper ........................ 235/487 |
| 6,478,222 B1 | * | 11/2002 | Sarfati ........................ 235/380 |
| 6,488,211 B1 | * | 12/2002 | Everett et al. ............... 235/492 |

FOREIGN PATENT DOCUMENTS

| JP | 63-244133 | 10/1988 |
| WO | WO 00/46666 | 8/2000 |

OTHER PUBLICATIONS

Hamann U., "Chip Cards—The Application Revolution", Electron Devices Meeting, 1997. Technical Digest, International Washington, DC, USA Dec. 7–10, 1997, New York, NY, USA, IEEE, US. pp. 15–22, Dec. 7, 1997.

* cited by examiner

Primary Examiner—Michael G. Lee
Assistant Examiner—Ahshik Kim
(74) Attorney, Agent, or Firm—McDermott Will & Emery LLP

(57) ABSTRACT

A memory card includes a first nonvolatile memory, a second nonvolatile memory, and a separating portion. The first nonvolatile memory has a predetermined erase unit. The second nonvolatile memory has an erase unit that is larger than the erase unit of the first nonvolatile memory. The separating portion separates at least the portion of the program data that are downloaded onto the memory card that has the possibility of being rewritten, and stores the separated portion onto the first nonvolatile memory and stores the remaining portion onto the second nonvolatile memory.

15 Claims, 5 Drawing Sheets

```
Void addPoint(i, value)
{
    point[i] +=value*kangenritu[i];
}
```

ST51: _baload  obtain i<sup>th</sup> data of kangenritu array (kangenritu[i]) on Flash memory (X)

ST52: _mul  multiply Value and kangenritu[i]

ST53: _baload  obtain ith data of point array (point[i]) on EEPROM (Y)

ST54: _add  add result of ST52 and point[i]

ST55: _bastore  store to point[i] on EEPROM (Z)

MEMORY CARD

BACKGROUND OF THE INVENTION

The present invention relates to a memory card, and more particularly to a memory card in which program data are downloaded and stored on a nonvolatile memory.

Memory cards are employed for reading/writing information with digital devices such as digital cameras, PDAs, portable audio devices, cellular phones, and personal computers. Two types of chips, which are a flash memory and a controller, are mounted on a memory card. Flash memories mounted on memory cards have recently increased in capacity to the extent that they are becoming capable of storing large amounts of data. At the present moment, however, memory cards only exchange data with digital devices. In some IC cards, application programs can be downloaded and executed. However, the capacity of their nonvolatile memory for program storage is much smaller than the capacity of flash memories mounted on memory cards.

SUMMARY OF THE INVENTION

It is an object of the present invention to provide a memory card whose circuit scale can be reduced.

A memory card according to the present invention includes a first nonvolatile memory, a second nonvolatile memory, and a separating portion. The first nonvolatile memory has a predetermined erase unit. The second nonvolatile memory has an erase unit that is larger than the erase unit of the first nonvolatile memory. The separating portion separates at least the portion of the program data that are downloaded onto the memory card that has the possibility of being rewritten, and stores the separated portion onto the first nonvolatile memory and stores the remaining portion onto the second nonvolatile memory.

According to this memory card, when the downloaded program is executed, program data are rewritten only in the first nonvolatile memory and not rewritten in the second nonvolatile memory. Thus, by rewriting variables or the like in the first nonvolatile memory, which has a small erase unit, the required buffer size is smaller than if the process were performed in the second nonvolatile memory, which has a large erase unit, and the circuit can be made small in scale.

Also, the size of the data that are temporarily buffered for rewriting is smaller in the first nonvolatile memory than in the second nonvolatile memory. Consequently, the buffering time for rewriting can be kept shorter than if the rewriting process were performed in the second nonvolatile memory, and the amount of time required for rewriting can be shortened.

Moreover, data security is improved because the program data that are downloaded are separated and stored on the first nonvolatile memory and the second nonvolatile memory.

DETAILED DESCRIPTION OF THE INVENTION

Figure 1:
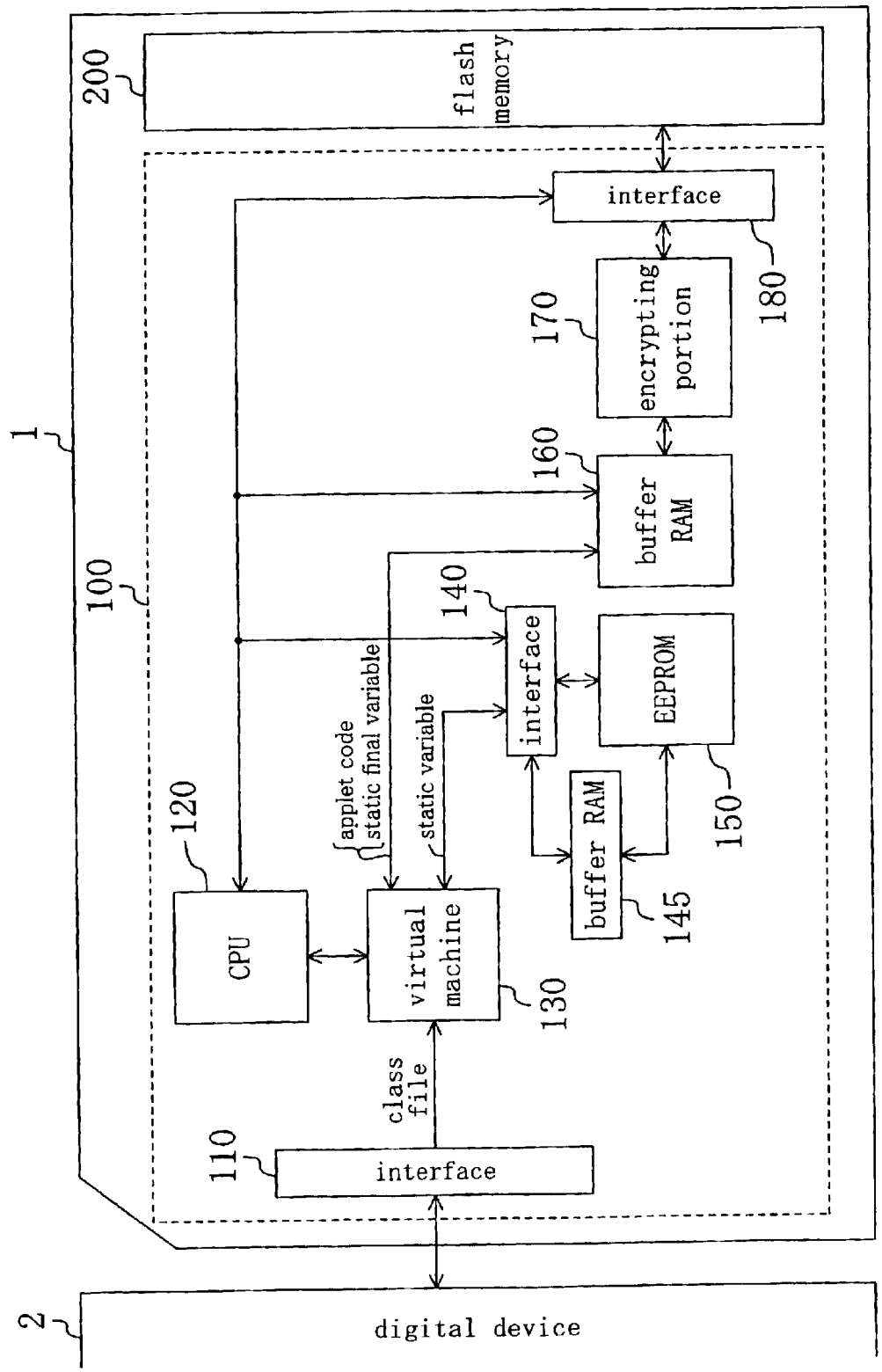
FIG. 1 is a block diagram showing the overall configuration of the memory card system according to an embodiment of the present invention.

Hereinafter, embodiments of the present invention are described in detail with reference to the drawings. Identical or equivalent parts in the drawings are assigned identical reference numerals and duplicate descriptions thereof are omitted.

Overall Configuration of the Memory Card System

FIG. 1 is a block diagram showing the overall configuration of the memory card system according to an embodiment of the present invention. In the system shown in FIG. 1, a memory card 1 is inserted into a slot (not shown) of a digital device 2 (such as a digital camera, PDA, portable audio device, cellular phone, or personal computer), and program data are downloaded from the digital device 2 onto the memory card 1. The downloaded program is executed inside the memory card 1.

Digital Device 2

The digital device 2 compiles source code written in Java (TM), which is an object oriented programming language, into bytecodes and transfers them to the memory card 1.

Memory Card 1

The memory card 1 includes a controller chip 100 and a flash memory chip 200.

The controller chip 100 includes interfaces 110, 140, and 180, a CPU 120, a virtual machine 130, an EEPROM 150, buffer RAMs 145 and 160, and an encrypting portion 170.

The interface 110 is an interface between the digital device 2 and the controller chip 100, and transfers class files (bytecodes) downloaded from the digital device 2 to the virtual machine 130.

The virtual machine 130 separates static variables from the class files given from the interface 110 and supplies them to the interface 140, and supplies the rest (applet codes and static final variables) to the buffer RAM 160. The virtual machine 130 also interprets, by an interpreter system, the program data (bytecodes) read out from the EEPROM 150 and the flash memory chip 200 into a format that can be executed by the CPU 120.

The CPU 120 runs the program interpreted by the virtual machine 130. The CPU 120 also controls the operation of the controller chip 100.

The interface 140 is an interface between the virtual machine 130 and the CPU 120 on one side and the EEPROM 150 and the buffer RAM 145 on the other. The interface 140 transfers static variables from the virtual machine 130 to the EEPROM 150 by way of the buffer RAM 145.

The buffer RAM 145 buffers data to be transferred to the EEPROM 150 and data output from the EEPROM 150. The buffer RAM 145 also temporarily buffers data stored in the EEPROM 150 when those data are rewritten.

The EEPROM 150 stores static variables from the interface 140. The EEPROM 150 is a nonvolatile memory in which data are erased in word units.

The buffer RAM 160 temporarily stores the applet codes and the static final variables from the virtual machine 130. The buffer RAM 160 also temporarily stores program data that have been read out from the flash memory 200 and decrypted by the encrypting portion 170.

The encrypting portion 170 encrypts program data (applet codes and static final variables) stored in the buffer RAM 160 and supplies them to the interface 180. The encrypting portion 170 also decrypts program data that have been read out from the flash memory chip 200.

The interface 180 is an interface between the controller chip 100 and the flash memory chip 200, and transfers program data (applet codes and static final variables)

encrypted by the encrypting portion 170 to the flash memory chip 200. The interface 180 also transfers program data that have been read out from the flash memory chip 200 to the encrypting portion 170.

The flash memory chip 200 stores encrypted program data (applet codes and static final variables) from the interface 180. The flash memory chip 200 is a nonvolatile memory in which data are erased in units of blocks or chips. That is, the unit erased in the flash memory chip 200 is larger than the unit erased in the EEPROM 150.

Downloading the Program

Program data are downloaded from the digital device 2 to the memory card 1 in the memory card system shown in FIG. 1 as follows.

Figure 2:
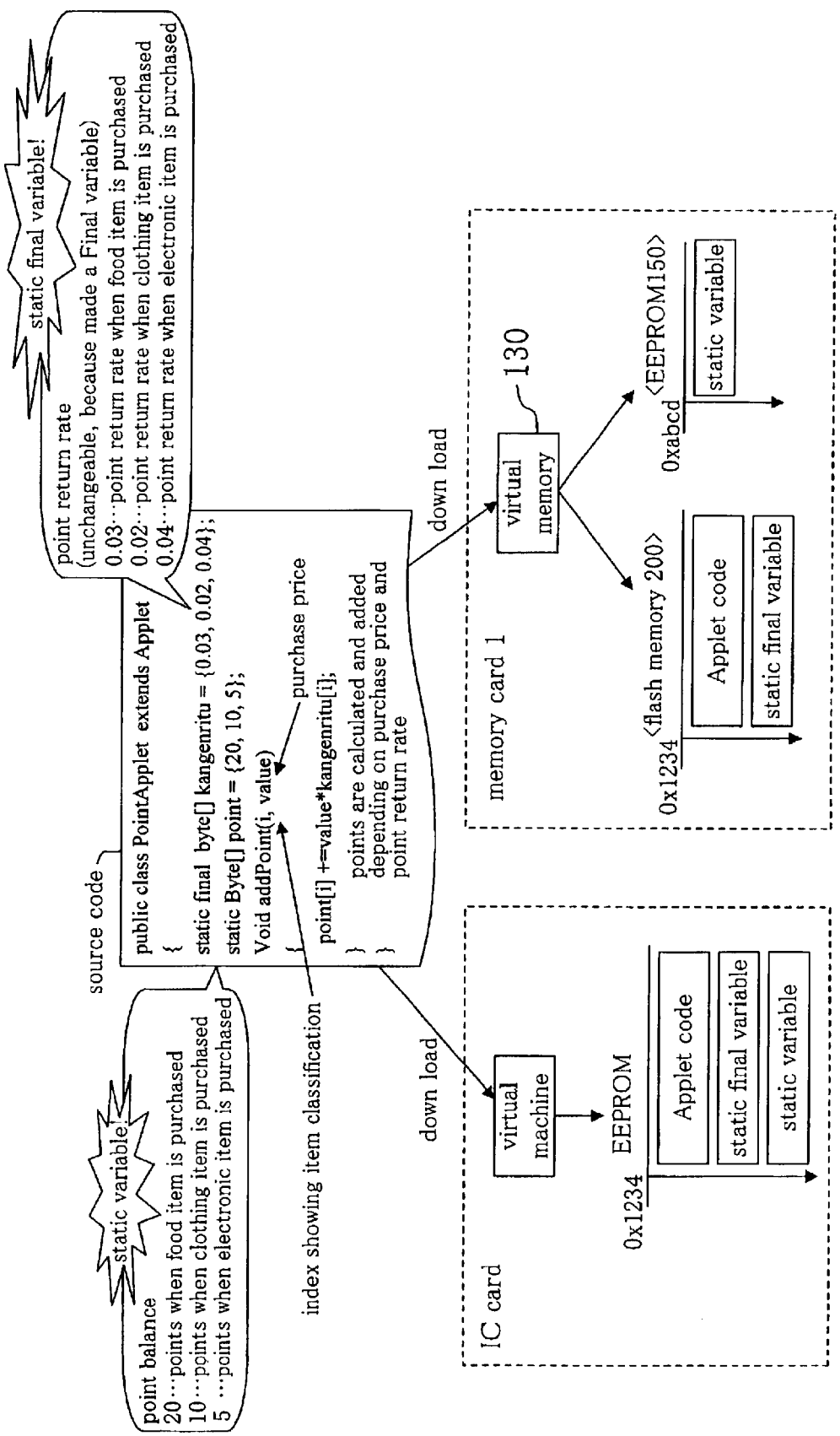
FIGS. 2 and 3 are diagrams for describing the process of storing program data downloaded from a digital device onto the memory card.

Here, program data with source code like that shown in FIG. 2 are downloaded. The source code shown in FIG. 2 is an application program for employing the memory card 1 as a point card, and is written in Java (TM). The program adds points at different point return rates (may also be referred to as "kangenritu") for each item (food, clothing, electronics) that is purchased. The point balance is recorded for each purchased item. Since the point balance is updated each time an item is purchased, it is declared a static variable. On the other hand, the point return rate stays unchanged from its initially set value, so it is declared a static final variable.

The source code written in Java (TM) is compiled into bytecodes and downloaded from the digital device 2 onto the memory card 1. Bytecodes (class files) downloaded onto the memory card 1 are separated by the virtual machine 130 into a static variable portion and an Applet code and static final variable portion. The Applet code and static final variable portion is stored in the flash memory 200, and the static variable portion is stored in the EEPROM 150. Thus, the portion that has the possibility of being rewritten (the static variable portion) is stored in the EEPROM 150, and the portion that does not have the possibility of being rewritten (the Applet code and static final variable portion) is stored in the flash memory 200 after being encrypted at the encrypting portion 170. It should be noted that in an IC card onto which an application program can be downloaded and executed, all the downloaded bytecodes (class files) are stored in its internal EEPROM without being separated, as shown in FIG. 2.

Figure 3:
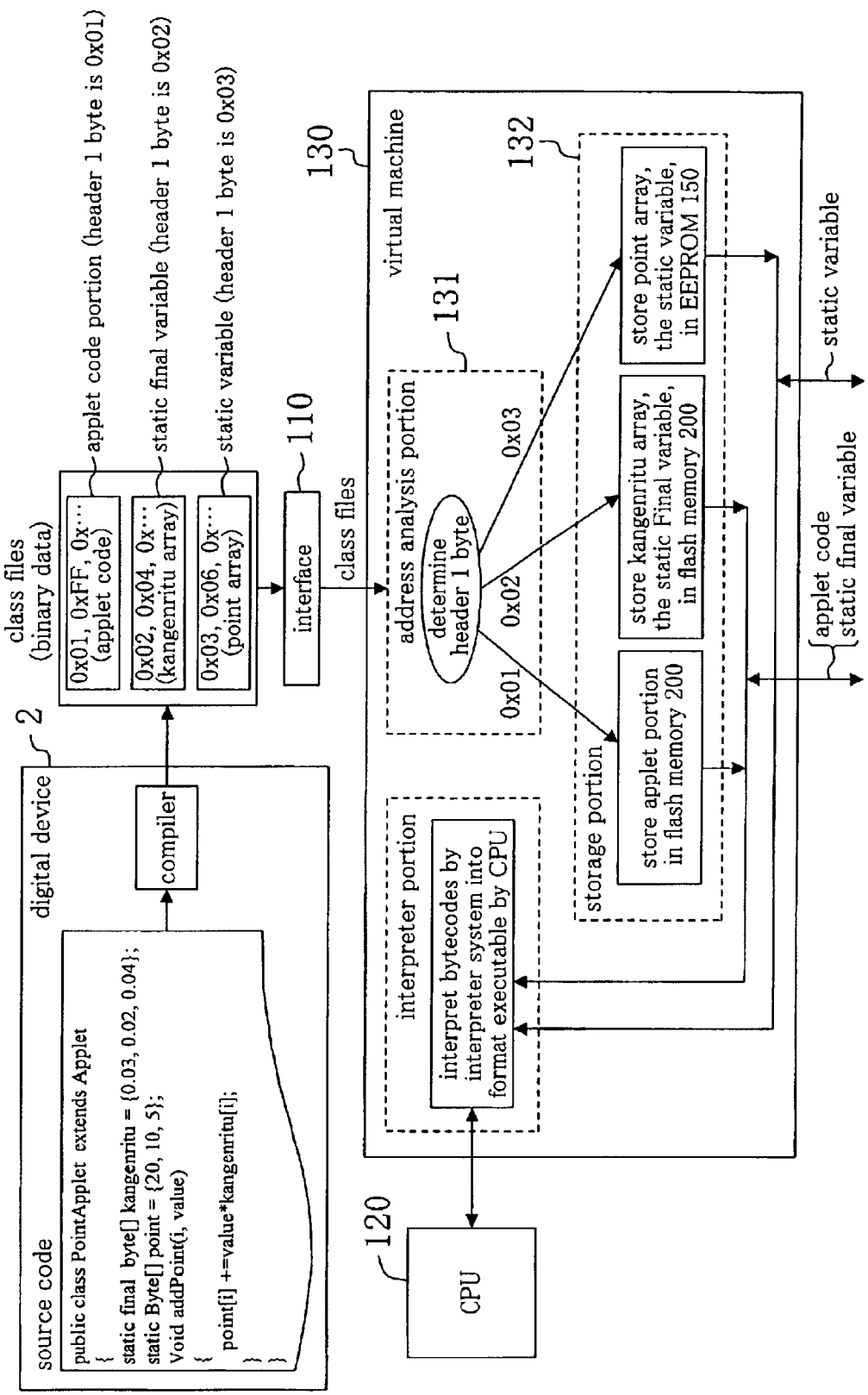

Next, the separating process performed by the virtual memory 130 is described in greater detail with reference to FIG. 3.

Class files that are downloaded from the digital device 2 onto the memory card 1 include an applet code portion (method), a static final variable, and a static variable. The header 1 byte of the applet code portion is 0x01, the header 1 byte of the static final variable is 0x02, and the header 1 byte of the static variable is 0x03. Therefore, class files that have been compiled by the digital device 2 can be identified as the applet code portion, the static final variable, and the static variable by determining the header 1 byte. This is determined by an address analysis portion 131 in the virtual machine 130.

A storage portion 132 stores program data onto the flash memory 200 or the EEPROM 150 in accordance with the result determined by the address analysis portion 131. When it is determined that the header 1 byte is 0x01, the program data (applet code portion) is stored in the flash memory 200. When it is determined that the header 1 byte is 0x02, the program data (static final variable) is stored in the flash memory 200 (after being encrypted by the encrypting portion 170). When it is determined that the header 1 byte is 0x03, the program data (static variable) is stored in the EEPROM 150.

Figure 4:
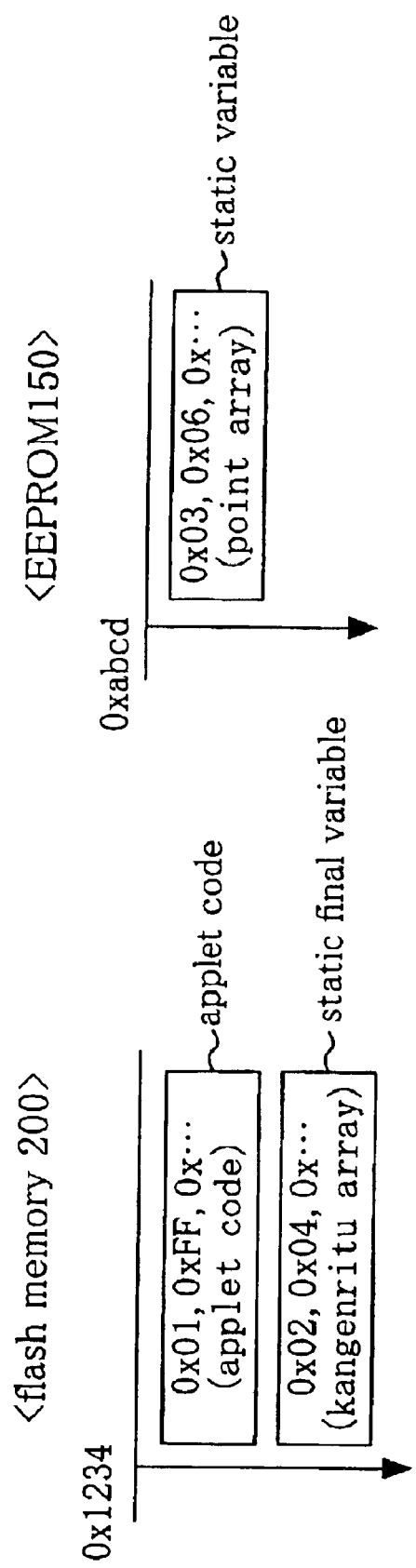
FIG. 4 shows the program data stored in the flash memory and the EEPROM.

The outcome of the above process is that applet codes and static final variables are stored in the flash memory 200 and static variables are stored in the EEPROM 150, as shown in FIG. 4.

Executing the Downloaded Program

Figures 5A, 5B, 5C:
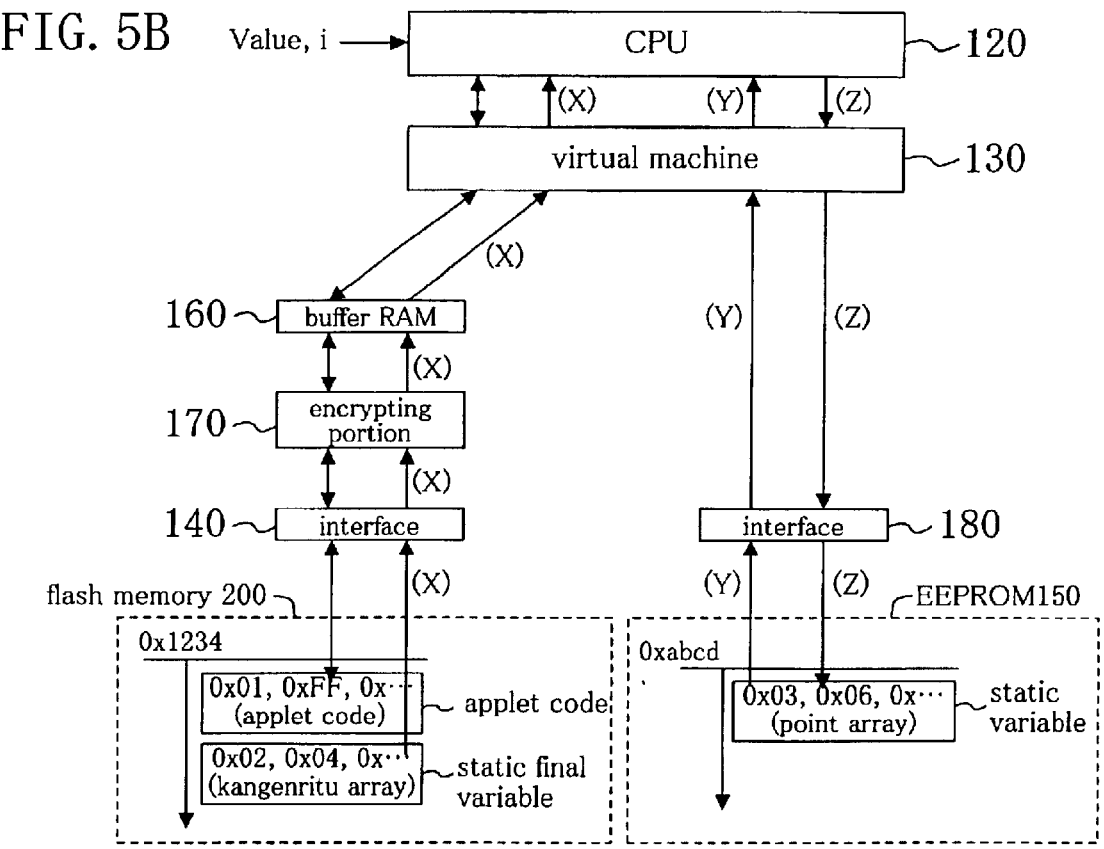
FIGS. 5A to 5C are diagrams for describing the procedure by which the program is executed.

Next, the program that is separated and stored in the flash memory 200 and the EEPROM 150 is executed as described below. The process executed here is shown by the source code in FIG. 5A, and is described below with reference to FIGS. 5B and 5C.

When the purchase price (value) and the index (i) showing the item classification are input into the CPU 120, the virtual machine 130 fetches the "command" stored in the applet code portion (addPoint) on the flash memory 200 and the interpreter portion interprets it by an interpreter system into a format that can be executed by the CPU 120. The interpreted command is run by the CPU 120 to perform the following process steps.

Step ST51

_baload . . . The $i^{th}$ data of the kangenritu array (kangenritu[i]) on the flash memory 200 are obtained (X).

Step ST52

_mul . . . The Value and the kangenritu[i] are multiplied.

Step ST53

_baload . . . The $i^{th}$ data of the point array (point[i]) on the EEPROM 150 are obtained (Y).

Step ST54

_add . . . The result of the multiplication process at Step ST52 and the point[i] obtained at Step ST53 are added.

Step ST55

_bastore . . . The result of the addition process at Step ST54 is stored in point[i] on the EEPROM 150 (Z). That is, the data of point[i] are rewritten. Ps Effect With current technologies, the storage capacity of an EEPROM is much smaller than that of a flash memory, so that large-sized programs should be stored in a flash memory.

Ordinarily, small amounts of data (such as variables) in the program are rewritten when a program is executed. If a program stored in a flash memory is run, then data are rewritten in the erase unit of the flash memory. However, the erase unit of a flash memory is significantly larger than the erase unit of an EEPROM, so that executing a program stored in a flash memory requires a massive buffer memory for rewriting variables, for example.

For example, an NAND-type flash memory with:

storage capacity: 512 Mbit program unit: 512 bytes=1 page erase unit: 32 pages requires a 16 kbyte buffer RAM.

With the memory card system according to an embodiment of the present invention, the portion of the program data (class files) downloaded from the digital device 2 onto the memory card 1 that has the possibility of being rewritten (static variables) is stored on the EEPROM 150 and the portion that does not have the possibility of being rewritten (Applet code and static final variables) is stored on the flash memory 200. Consequently, the rewriting of data during the program is not performed in the flash memory 200 and is performed only in the EEPROM 150. Thus, the rewriting of variables or the like is performed in the EEPROM 150, which has a small erase unit, so that the capacity of the buffer memory (buffer RAM 145) necessary for rewriting can be smaller than if rewriting were performed in the flash memory 200, which has a large erase unit, and the circuit scale can be reduced. Also, the size of data that are temporarily buffered in order to be rewritten is smaller in the EEPROM 150 than in the flash memory 200, and therefore the buffering time for rewriting can be kept shorter than if the rewriting process is performed in the flash memory 200, and the amount of time required for rewriting can be shortened.

Moreover, data security is improved because the program data downloaded onto the memory card 1 are separated and stored on the flash memory 200 and the EEPROM 150. Program data stored in the flash memory chip 200 are encrypted by the encrypting portion 170, so security is increased even further.

A encrypting/decrypting process is not required to access program data stored on the EEPROM 150, so that processing times can be improved.

It should be noted that although here the static variables were stored on the EEPROM 150 and the Applet code and static final variables were stored on the flash memory 200, it is also possible to store the static variables and the static final variables on the EEPROM 150 and store the Applet code on the flash memory 200.

Also, if reading data from the flash memory 200 and decrypting them with the encrypting portion 170 takes longer than the time required to read out data from the EEPROM 150, then portions frequently accessed in the flash memory 200 can be written onto the EEPROM 150 by the control of the CPU 120.

It is also possible to configure the buffer RAM 145 and the buffer RAM 160 as a common RAM, which can be operated as the buffer RAM for the EEPROM 150 when the EEPROM 150 is operating and operated as the buffer RAM for the flash memory 200 when the flash memory 200 is operating. Accordingly, the circuit area required for the RAM can be reduced and the circuit can be made smaller in scale.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A memory card, comprising:
a first nonvolatile memory having a predetermined erase unit; a second nonvolatile memory having an erase unit that is larger than the erase unit of the first nonvolatile memory; and
a separating portion that separates at least a portion of program data downloaded onto the memory card based on attributes of data contained in the program data, and storing the separated portion to the first nonvolatile memory and storing a remaining portion to the second nonvolatile memory.

2. The memory card according to claim 1, wherein the program data includes functions and variables, and
the separating portion stores the functions to the second nonvolatile memory, stores variables that are likely to be frequently rewritten to the first nonvolatile memory, and stores variables that are not likely to be frequently rewritten to the second nonvolatile memory.

3. The memory card according to claim 1, wherein the program data are a class written in an object oriented programming language, and
the separating portion stores variables of the class to the first nonvolatile memory and stores a method of the class to the second nonvolatile memory.

4. The memory card according to claim 1, wherein the program data are a class written in an object oriented programming language, and
the separating portion stores variables of the class that are likely to be frequently rewritten to the first nonvolatile memory, and stores variables of the class that are not likely to be frequently written and a method of the class to the second nonvolatile memory.

5. The memory card according to claim 1, further comprising an encrypting portion for encrypting the remaining portion to be stored in the second nonvolatile memory, and
wherein the first nonvolatile memory, the separating portion, and the encrypting portion are formed on a same chip.

6. The memory card according to claim 1, wherein the first nonvolatile memory is an EEPROM, and the second nonvolatile memory is a flash memory.

7. A memory card comprising:
a first nonvolatile memory having a predetermined erase unit;
a second nonvolatile memory having an erase unit that is larger than the erase unit of the first nonvolatile memory; and
a separating portion configured to separate a first data unit including a first component of one program data and a second data unit including a second component of the program data, and
wherein the first data unit is stored in the first nonvolatile memory and the second data unit is stored in the second nonvolatile memory.

8. The memory card according to the claim 7, wherein the first data unit is rewritten upon downloading data.

9. The memory card according to the claim 7, wherein the program data includes functions and variables, and
the second data unit includes the functions, and the functions are stored in the second nonvolatile memory.

10. The memory card according to the claim 9, wherein a first part of the variables that are likely to be rewritten are stored in the first nonvolatile memory.

11. The memory card according to the claim 7, wherein the program data are a class written in an object oriented programming language, and
the class includes variables and a method, and
the method is stored in the second volatile memory.

12. The memory card according to the claim 7, wherein the program data are a class written in an object oriented programming language, and
the class includes variables and a method, and
a first part of the variables that are likely to be rewritten is stored in the first nonvolatile memory.

13. The memory card according to claim 7, further comprising an encrypting portion for encrypting the program data,
wherein the encrypting portion is arranged between the separating portion and the second nonvolatile memory, and
the first nonvolatile memory, the separating portion, and the encrypting portion are formed on a same chip.

14. The memory card according to claim 7, wherein the second data unit is encrypted at the encrypting portion after separating the second data at the separating portion.

15. The memory card according to claim 7, wherein the first nonvolatile memory is an EEPROM, and the second nonvolatile memory is a flash memory.

* * * * *